May 28, 1957
A. T. KULICK
2,793,500
VARIABLE FLOW HYDRAULIC SYSTEM
Filed Nov. 25, 1953
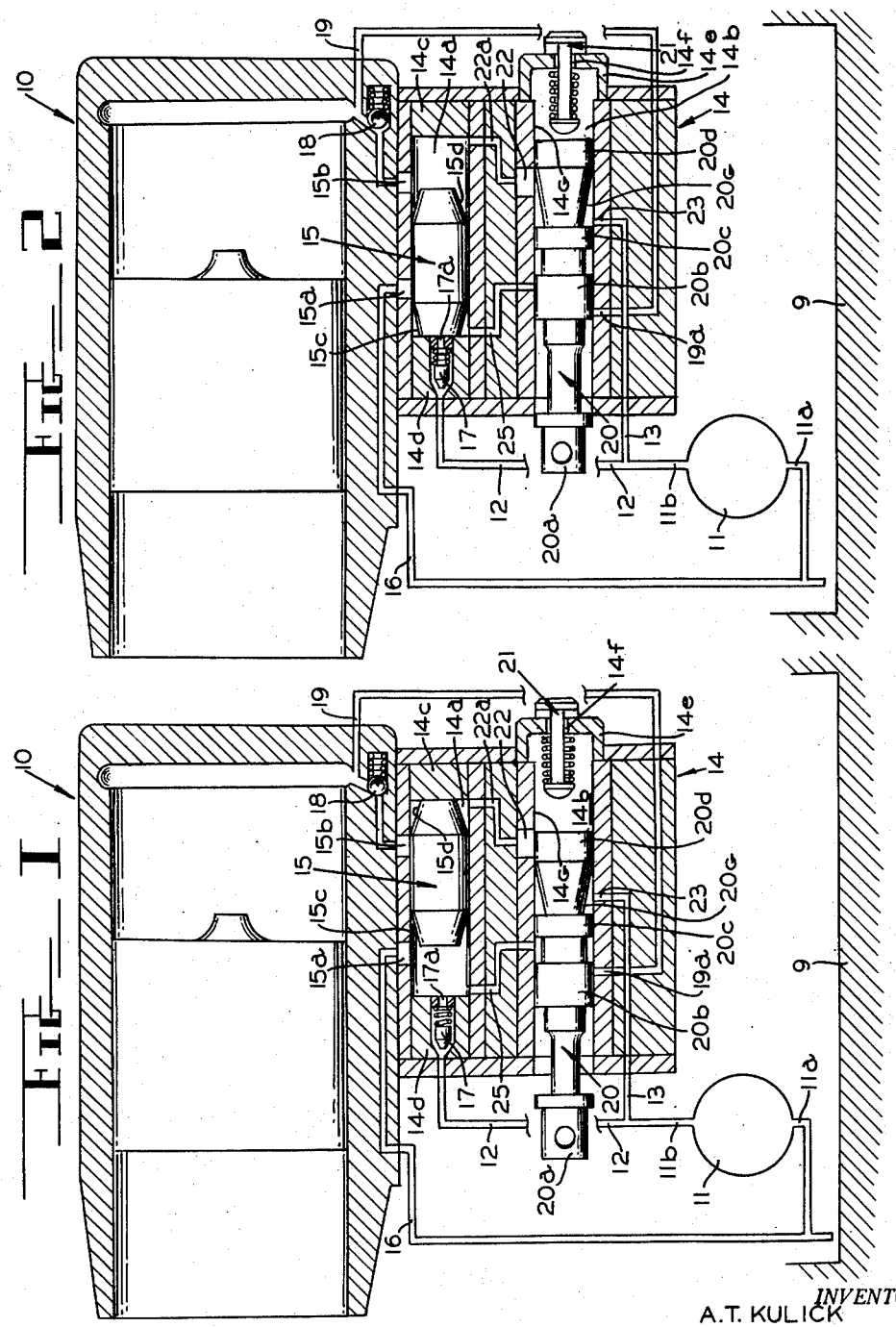
INVENTOR.
A.T. KULICK
BY
ATTORNEYS

United States Patent Office 2,793,500
Patented May 28, 1957

2,793,500
VARIABLE FLOW HYDRAULIC SYSTEM

Alden T. Kulick, Dearborn, Mich., assignor to Ford Motor Company, Dearborn, Mich., a corporation of Delaware Application November 25, 1953, Serial No. 394,400

4 Claims. (Cl. 60—52)

This invention relates to an improved hydraulic control system for tractors.

It has become customary on modern agricultural tractors to provide a plurality of power lifted hitch links on such tractor of which any one of a large number of different mounted type implements may be mounted and thus be conveniently transported, or the working depth of the implement controlled in accordance with the height of such power lifted hitch links. However, as tractors have increased in size, the implements used with such tractors have correspondingly increased in overall weight, with the result that any hydraulic system heretofore utilized for controlling the actuation of such hitch links suffered from either one of two undesirable characteristics. When the hydraulic system was of the so called "starved pump" type there was a substantial lag in the application of fluid pressure to the ram or rams controlling the height of the tractor hitch links so that correction to conform to varying soil conditions could not be accomplished with sufficient rapidity. On the other hand, the response of the so called "solid type" hydraulic system has been too rapid. In this type of system, the pump operates continuously and normally the entire pump output is bypassed to the sump through a shuttle type control valve. When such control valve would be actuated to a closed position, the pressure in the system would immediately rise to the maximum permitted by the relief valve conventionally incorporated in such system with the result that a surge of hydraulic fluid into the tractor ram would occur. Such surge of fluid produced sufficient acceleration of the tractor hitch links and the implement connected thereto as to set up a very noticeable and undesirable reaction force on the tractor. The cut off of fluid flow occurs with equal sharpness. In operations such as plowing where continuous corrections of working depth must necessarily be made to conform to varying soil conditions across the field, the operator was subjected to many impacts resulting from the too rapid operation of the hydraulic system, and operation of the implement was impaired due to the "hunting" of the system.

Acordingly, it is the object of this invention to provide an improved hydraulic system for tractors.

A further object of this invention is to provide an improved tractor hydraulic system of the "solid" type characterized by the fact that the whole fluid output of the pump is not immediately applied to the tractor ram but intially, a division of the pump output between the tractor ram and a second circuit flowing into the sump of the hydraulic system is achieved so that the acceleration of the tractor ram is reduced to the point that no operator discomfort results. Similarly when the tractor ram approaches a desired position, the flow of fluid to the ram is automatically gradually reduced, so that "hunting" is eliminated.

Still another object of this invention is to provide a hydraulic control system for tractors wherein the rate of response of the system is selectively determined by the degree of shifting of a primary control element from its neutral position.

The specific nature of this invention as well as other objects and advantages thereof will become apparent to those skilled in the art from the following detailed description taken in conjunction with the annexed sheets of drawings on which, by way of preferred example only, is illustrated one embodiment of this invention.

On the drawings:

Figure 1 is a schematic circuit diagram of a tractor hydraulic system embodying this invention, with the various valve elements of the system shown in their neutral position.

Figure 2 is a view similar to Figure 1 but showing the valve elements in their position corresponding to a demand for pressured fluid to be supplied to the tractor ram.

As shown on the drawings:

The numeral 10 represents a single acting hydraulic ram of the type commonly found on agricultural tractors. It is to be understood that more than one such ram may be employed according to the requirements of the particular application and that all such rams will be connected in parallel to each other with respect to the hydraulic system. A constantly operating pump 11 is also provided which has its inlet portion 11a connected to a reservoir or sump 9. As is conventional, the sump 9 may be defined by a casing within which all valve elements of the system are mounted. The outlet of pump 11 is represented by the conduit 11b and such outlet is directly connected to two possible fluid circuits, respectively a first circuit initiated by a conduit 12 and a second circuit initiated by the conduit 13.

A valve housing 14 is provided having a pair of valve bores 14a and 14b formed therein. The valve bore 14a is closed at opposite ends by plugs 14c and 14d and is utilized to mount a shuttle type valve element 15 which cooperates with a pair of axially spaced ports 15a and 15b. Such ports are spaced apart sufficiently so that when the one port, for example port 15b as shown in Figure 1 is closed by shuttle element 15, the other port 15a will be entirely open for passage of fluid therethrough and vice versa. Port 15a is connected by a conduit 16 to the sump 9. A conventional low pressure regulating valve 17 is mounted in end plug 14d of valve bore 14a and is the type which operates to maintain a pre-determined low pressure on its inlet side. The inlet side of low pressure regulating valve 17 is connected to conduit 12 while the outlet passage 17a communicates directly with that end of the valve bore 14a which is adjacent to the port 15a.

Thus the first hydraulic circuit comprises a series connection from the discharge side of pump 11, through conduit 12, through the low pressure regulating valve 17, and thence through the conduit 16 to the sump 9. Accordingly, it is clear that so long as the shuttle valve 15 remains in the neutral position indicated in Figure 1, wherein the port 15a is entirely open, the entire output of the pump will be bypassed to the sump through the low pressure regulating valve 17 and hence, only a predetermined low pressure, determined by the characteristics of valve 17, will be maintained in the hydraulic system.

The other port 15b leading from the shuttle valve chamber 14a is connected through a conventional check valve 18 to the tractor ram 10. Additionally, a conduit 19 communicates from the tractor ram to a port 19a provided in the wall of the valve bore 14b for a purpose to be hereafter described.

The valve bore 14b is utilized to slidably mount a primary control valve 20. The one end 20a of such control valve is conventionally connected to any suitable manually or automatically operating linkage (not shown) to permit the tractor operator to either manually shift such valve or, as is conventional, to permit such valve to be shifted in response to characteristics of the tractor operation such as the draft exerted by the implements, the implement height relative to the ground, etc.

Valve element 20 is further provided with three (3) axially spaced piston portions 20b, 20c, and 20d respectively. A port 22 and conduit 22a are provided which communicate with the right hand end of the shuttle valve chamber 14a and port 22 is dimensioned to produce an under lap by piston portion 20d and located so that the left hand end of port 22 is closed by the piston portion 20d in the neutral position of the valve element 20 while flow is permitted thru the right hand portion of port 22. Additionally, a port 23 is provided which communicates with conduit 13. Port 23 is located approximately centrally between the piston portions 20c and 20d in the neutral position of valve element 20. The port 19a, which has already been referred to, communicates with the control valve chamber 14b at a position wherein it is covered by the piston portion 20b in the neutral position of valve element 20a. A drain passage 25 is provided which communicates between the left hand end of shuttle valve chamber 14a and the annular space defined between piston portions 20b and 20c of the valve element 20. That portion 20g of the valve element 20 which lies intermediate the piston portions 20c and 20d is provided with a taper, shown in exaggerated form in the drawings, increasing in diameter towards the piston portion 20d for a purpose that will be hereafter described in detail. Additionally, both ends of shuttle valve element 15 are similarly tapered as indicated at 15c and 15d respectively.

Thus, the second fluid circuit is seen to extend from the discharge side of pump 11 through conduit 13, through port 23 into the control valve bore 14b, then through port 22 and conduit 22a to the shuttle valve chamber 14a thence through port 15b to the check valve 18 and thence to the ram 10. However, fluid flow cannot take place through this second circuit until the control valve element 20 is shifted to the right, as viewed in the drawings, to occupy the pressure demand position illustrated in Figure 2.

In such position, piston portion 20d then uncovers the port 22 and permits the low pressure then existing in the discharge side of pump 11 to flow into the shuttle valve chamber 14a. This low pressure is, of course, of higher value than the pressure existing in the sump 9 and, accordingly, the pressure produced on the right hand end of shuttle valve element 15 will be greater than that produced on the left hand end of such valve element. Thus, the shuttle valve element 15 will tend to be pressure shifted to the left as viewed in the drawings to occupy the position shown in Figure 2. However, any such movement of the shuttle valve tends to reduce flow thru the first circuit thru the cooperation of tapered portion 15c with port 15a and the pressure in the left hand end of bore 14a increases so that movement of shuttle valve 15 to the final position shown in Figure 2 occurs gradually.

When the shuttle valve is thus shifted, a direct fluid passage to the ram 10 is then provided, and fluid will flow into the ram 10 as soon as the pressure in the system builds up to a sufficient value to overcome the moderate bias of the check valve 18. When the port 15a is entirely closed by the shuttle valve element 15, all fluid flow to the sump 9 through the first fluid circuit is cut off and hence the pump will build up the full pressure permitted in the hydraulic system by the conventional pressure relief valve (not shown) which is connected in the system at any convenient point.

To reduce the rate of pressure buildup in a system, the provision of tapered surfaces 15c and 15d on the shuttle valve 15 has proven to be quite effective, inasmuch as such surfaces effect a more gradual interruption of flow through the first hydraulic circuit and a more gradual increase in flow through the second hydraulic circuit as the shuttle valve 15 is shifting from its left hand or neutral position over to its right hand or pressure demand position.

The rate of response of the aforedescribed hydraulic system may be conveniently controlled as a function of the amount of displacement of the control valve element 20 from its neutral position. This characteristic is imparted by the tapered surface 20g on control valve 20. Thus, if the control valve 20 is shifted a very slight degree from its neutral position shown in Figure 1, the tapered surface 20g permits only a small amount of fluid to flow into the shuttle valve chamber 14a. This small flow of fluid will produce a slight displacement of shuttle valve element 15 enough to permit the opening of the port 15b and the admission of a small amount of fluid to the tractor ram 10. Thus, very small increments and rates of displacement of the tractor ram 10 may be produced by a correspondingly slight displacement of the control valve element 20 from its neutral position. On the other hand, should a rapid response of the tractor ram 10 be desired, it is only necessary that the control valve element 20 be shifted to a greater degree from its neutral position shown in Figure 1. Such greater displacement, as indicated in Figure 2, completely opens the port 22 and permits an immediate large flow of fluid into the shuttle valve chamber 14a with the corresponding increase in the rate of displacement of the shuttle valve element 15.

Whenever the aforedescribed system is utilized in conjunction with any well known servo type control linkage, which shifts the control valve to and from neutral position in accordance with the displacements of the ram 10 from a selected position, a further improvement in operation may be derived by the provision of a low pressure relief valve 21 which controls discharge of fluid from the chamber 14g defined between the end of valve piston portion 20d and a closure wall 14e. Relief valve 21 controls discharge of fluid from chamber 14g thru a port 14f so as to tend to produce a low pressure in chamber 14g whenever fluid is supplied thereto. As shown in Figure 1, when control valve 20 approaches its neutral position after a displacement to the right, an under-lap of piston portion 20d relative to port 22 permits fluid to be pushed out of valve chamber 14a by the return movements of shuttle valve 15 to discharge to sump thru chamber 14g and low pressure relief valve 21, hence momentarily produces a low pressure in chamber 14g. Such low pressure assists the control valve 20 to achieve its neutral position.

To permit the ram 10 to move in the opposite direction, corresponding to removal of fluid from the ram 10, it is only necessary that the control valve 20 be manually or automatically shifted, as the case may be, to the left as viewed in the drawings. Such displacement of the control valve element 20 opens the port 19a to permit fluid to drain directly from the ram 10 through the port 19a, drain conduit 25 and thence directly to the sump through conduit 16. Such draining action has no effect on the pressure conditions existing in the first hydraulic circuit.

It will, of course, be understood that various details of construction may be varied through a wide range without departing from the principles of this invention and it is, therefore, not the purpose to limit the patent granted hereon otherwise than necessitated by the scope of the appended claims.

I claim:

1. In a hydraulic system of the type having a fluid reservoir, a constantly operating pump having its inlet connected to said reservoir and a ram operable by fluid supplied by said pump; means defining a first and second fluid circuit each connected to the discharge side of said pump, said first circuit extending to said reservoir and said second circuit extending to said ram, said first circuit including a pressure regulating valve having an inlet and an outlet and being of the type operable to maintain a predetermined low pressure in its inlet, a housing defining a first valve bore in fluid communication with said outlet, a shuttle valve reciprocable in said first valve bore, said valve bore having a pair of axially spaced shuttle ports cooperable with said shuttle valve so that one of said shuttle ports is open whenever the other of said shuttle ports is fully closed, means connecting said one shuttle port to said reservoir whereby said predetermined low pressure is maintained at the discharge side of said pump so long as said one shuttle port is uncovered by said shuttle valve, said second fluid circuit including a housing defining a second valve bore, an externally actuated control valve slidable in said second valve bore, said second valve bore having a pair of axially spaced control ports, a piston portion on said control valve disposed to control fluid communication between said control ports and having a neutral position cutting off fluid flow between said control ports, said second fluid circuit including said pair of control ports, the other end of said first valve bore, the other one of said shuttle ports and said ram, whereby actuation of said control valve to a position permitting fluid flow between said control ports shifts said shuttle valve to reduce flow in said first fluid circuit and thereby increase pressure and flow in said second fluid circuit.

2. The combination defined in claim 1 wherein the port closing surfaces of said shuttle valve are tapered on their leading edges, thereby reducing the rate of fluid pressure changes in said circuits.

3. The combination defined in claim 2 wherein the port closing surface of said control valve is tapered, whereby the speed of movement of said ram is proportional to the extent of movement of said control valve from said neutral port closing position.

4. The combination defined in claim 1 plus means defining a fluid chamber receiving a portion of said control valve in piston-like relationship, a low pressure relief valve connected between said chamber and the reservoir, and fluid conduit means permitting discharge of fluid from said first valve bore into said fluid chamber as said shuttle valve returns to its neutral position, whereby a low pressure fluid force is momentarily exerted on said control valve to assist in returning to its said neutral position.

References Cited in the file of this patent

UNITED STATES PATENTS

| 1,829,655 | Huguenin | Oct. 27, 1931 |
| 1,943,061 | Douglas | Jan. 9, 1934 |
| 2,057,087 | De Millar | Oct. 13, 1936 |
| 2,477,710 | Worstell | Aug. 2, 1949 |